United States Patent
Hamzah et al.

(10) Patent No.: US 12,516,574 B2
(45) Date of Patent: *Jan. 6, 2026

(54) METHOD AND APPARATUS FOR CONTROLLING A ROTARY STEERABLE SYSTEM USING CLOSED-LOOP SYSTEM(S)

(71) Applicant: Nabors Drilling Technologies USA, Inc., Houston, TX (US)

(72) Inventors: Mohammad Hamzah, Katy, TX (US); Austin Groover, Spring, TX (US); Carlos Rolong, Spring, TX (US); Christopher Papouras, Houston, TX (US)

(73) Assignee: NABORS DRILLING TECHNOLOGIES USA, INC., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/769,070

(22) Filed: Jul. 10, 2024

(65) Prior Publication Data

US 2024/0360724 A1    Oct. 31, 2024

Related U.S. Application Data

(63) Continuation of application No. 17/242,467, filed on Apr. 28, 2021, now Pat. No. 12,065,930.

(51) Int. Cl.
*E21B 7/06* (2006.01)
*E21B 44/00* (2006.01)
*E21B 44/02* (2006.01)
*E21B 47/024* (2006.01)

(52) U.S. Cl.
CPC ............... *E21B 7/06* (2013.01); *E21B 44/00* (2013.01); *E21B 44/02* (2013.01); *E21B 47/024* (2013.01); *E21B 2200/20* (2020.05)

(58) Field of Classification Search
CPC . E21B 7/06; E21B 44/00; E21B 44/02; E21B 47/024; E21B 2200/20
See application file for complete search history.

(56) References Cited

U.S. PATENT DOCUMENTS

| | | | |
|---|---|---|---|
| 5,842,149 A * | 11/1998 | Harrell | E21B 44/02 702/9 |
| 2005/0006145 A1 | 1/2005 | Downton | |
| 2019/0330968 A1 | 10/2019 | Boone et al. | |
| 2022/0178240 A1* | 6/2022 | Aman | E21B 45/00 |
| 2022/0349260 A1 | 11/2022 | Hamzah et al. | |

* cited by examiner

*Primary Examiner* — Robert E Fuller
(74) *Attorney, Agent, or Firm* — Haynes and Boone, LLP (57) ABSTRACT

An apparatus and method that form closed-loop system(s) between a downhole system that includes an RSS and a surface control system, to improve stability and performance assurance of the RSS. The apparatus and method account for the actual downhole conditions experienced by the RSS, the actual positioning of the RSS, and historical performance of the surface systems such as the mud pump system, the rotary drive system, and the draw works. These closed-loop systems generate and optimize parameters or target outputs, instructions to surface systems, and instructions for the RSS itself.

16 Claims, 8 Drawing Sheets

| WELLBORE POSITIONING | TOOL OPERATING MODE | DOWNHOLE DIAGNOSTICS |
|---|---|---|
| INCLINATION | MAGNETIC OR GRAVITY TOOL FACE | STEERING UNIT STABILITY |
| AZIMUTH | MANUAL OR AUTO | STICKSLIP CONDITION |
| TOTAL GRAVITY | STEERING PROPORTION | BIT/BHA WHIRL SEVERITY |
| TOTAL B | | |
| MAGNETIC DIP | | |

FIG. 3

| SURFACE PARAMETERS | ENGINEERING LIMITS | SYSTEM FAULTS |
|---|---|---|
| WEIGHT ON BIT | SURFACE PARAMETER MIN/MAX | LOSS OF PRESSURE |
| TOPDRIVE RPM | SURFACE PARAMETER SETPOINT | OVERHEATING |
| PUMP PRESSURE | EQUIPMENT INTERLOCKS | EQUIPMENT LOCK UP |
| DIFFERENTIAL PRESSURE | | OFFLINE/SHUT DOWN |

| SOURCE | MEASUREMENTS | CONDITIONS LEVELS | DESCRIPTION |
|---|---|---|---|
| ROTARY STEERABLE SYSTEM | STICKSLIP MEASUREMENT | STICKSLIP SEVERITY: LOW/MED/HIGH | THE RATIO OF THE INTERVAL THE COLLAR IS AT A COMPLETE STOP TO CONTINUE TO ROTATE |
| ROTARY STEERABLE SYSTEM | BIT/BHA WHIRL | WHIRL SEVERITY: LOW/MED/HIGH | THE FREQUENCY OF THE TOOL WHIRLING AROUND THE BOREHOLE AND NOT ROTATING AT THE CENTER OF THE BOREHOLE |
| ROTARY STEERABLE SYSTEM | STEERING UNIT STABILITY | STABLE/UNSTABLE | THE PERCENTAGE THAT THE TOOL IS STABILIZED AND ABLE TO ORIENTATE ITSELF TO THE HIGH SIDE AND TRUE NORTH |
| ROTARY STEERABLE SYSTEM | STEERING PROPORTION | DOGLEG SEVERITY YIELD | THE RELATIONSHIP BETWEEN TOOL SETTING AND DOGLEG SEVERITY PERFORMANCE |
| RIG CONTROL SYSTEM | PUMP PRESSURE MIN/MAX | WITHIN LIMITS/OUT OF LIMITS | PUMP PRESSURE RESPONSE COMPARED TO OPERATIONAL LIMITS/SPECIFICATIONS |
| RIG CONTROL SYSTEM | OFFLINE STATUS | OFFLINE/ONLINE | IS THE EQUIPMENT CONNECTED TO THE CONTROL SYSTEM |
| RIG CONTROL SYSTEM | TEMPERATURE | NORMAL/WARNING/CRITICAL | EQUIPMENT TEMPERATURE WITHIN SPECIFICATION |
| RIG CONTROL SYSTEM | EQUIPMENT POWER FAULT | OVER CURRENT/UNDER CURRENT | THE EQUIPMENT'S POWER STATUS INDICATING ABNORMAL CONDITIONS DURING OPERATIONS |

METHOD AND APPARATUS FOR CONTROLLING A ROTARY STEERABLE SYSTEM USING CLOSED-LOOP SYSTEM(S)

CROSS-REFERENCE TO RELATED APPLICATION

This application is a continuation of U.S. patent application Ser. No. 17/242,467, filed Apr. 28, 2021, the entire disclosure of which is hereby incorporated herein by express reference thereto.

FIELD OF THE DISCLOSURE

This disclosure relates to methods and apparatuses for controlling a rotary steerable system ("RSS") using closed-loop system(s). Specifically, the methods and apparatuses are adapted to manage the stability and performance assurance of the RSS's steering ability using closed-loop system(s) that require no manual or human intervention.

BACKGROUND

During drilling operations, the stability and performance of a RSS is often compromised when the drillstring drilling dynamics cause drilling dysfunctions, such as stickslip and whirl. When these drilling dysfunctions occur, the RSS often cannot maintain its orientation and positioning to steer the well according to commands sent by a directional driller.

Based on the tool diagnostics, which are sent uphole using mud pulse telemetry or other means of downhole communication, the directional driller will make changes to the drilling parameters such as flow rate, weight on bit, and top drive rotation to mitigate the drilling dysfunction that is affecting the performance of the RSS. When the current steering proportion and pad force does not meet well trajectory demand, the directional driller may issue downlink commands from the surface using flow rate, top drive rotation, or pump pressure fluctuations. In recent years, rig control systems have been able to automatically mitigate some of these drilling dysfunctions via an auto-driller providing a consistent weight on bit and the top drive controlling the quill to reduce stickslip severity.

However, conventional systems do not provide a closed-loop system that bridges the RSS diagnostics and the rig control system. As such, what is needed is a closed-loop system that reduces or eliminates the drilling dysfunctions that reduce the tool stability and performance.

SUMMARY OF THE DISCLOSURE

In some embodiments, the present disclosure includes a method of using closed-loop system(s) while drilling with a rotary steerable system ("RSS"), wherein the method includes (a) receiving, by a data acquisition system and from the RSS, downhole position data relating to a position of the RSS; (b) calculating, by a guidance system that is operably coupled to the data acquisition system and using the downhole position data, borehole position of the RSS; (c) comparing, by the guidance system, the borehole position of the RSS and a target well plan position; (d) generating, by the guidance system, a new path of trajectory for the RSS based on the comparison; wherein the new path of trajectory comprises a required dogleg yield and/or a required toolface; (e) translating, by the guidance system, the required dogleg yield and/or the required toolface to downlink command(s) that is executable by a rig control system; wherein the downlink command(s) involve instructions for the RSS to generate the required dogleg yield and/or the required toolface; (f) passing, from the guidance system and to the rig control system via the data acquisition system, the downlink command(s) for execution; wherein the steps (a), (b), (c), (d), (e), and (f) occur without user intervention to form a first closed-loop system while drilling with the RSS; and (g) the rig control system commanding a mud pump, a drive system, and/or a draw works to initiate the downlink command(s). In some embodiments, the first closed-loop system optimizes the new path of trajectory for the RSS based on responsiveness of the RSS. In some embodiments, the target well plan position comprises a tolerance window surrounding the target well plan position. In some embodiments, the method also includes comparing, by the guidance system, the borehole position of the RSS and the tolerance window surrounding the target well plan position; and the new path of trajectory is based on the comparison of the borehole position of the RSS and the tolerance window surrounding the target well plan position. In some embodiments, the method also includes (h) receiving, by the data acquisition system and from the RSS, downhole condition data relating to downhole conditions; (i) receiving, by the data acquisition system and from the rig control system, performance data relating to rig control system performance; (j) passing the downhole condition data and the performance data from the data acquisition system to the guidance system; (k) calculating, by the guidance system and using the downhole condition data, actual downhole conditions; (l) comparing, by the guidance system, the actual downhole conditions to target conditions; (m) generating, by the guidance system, rig control parameters based on the comparison and the performance data; (n) passing, from the guidance system and to the rig control system via the data acquisition system, the rig control parameters for execution; (o) the rig control system commanding the mud pump, the drive system, and/or the draw works using the rig control parameters; wherein the steps (h), (i), (j), (k), (l), (m), (n), and (o) occur without user intervention to form a second closed-loop system while drilling with the RSS. In some embodiments, the second closed-loop system optimizes the rig control parameters. In some embodiments, the rig control system compares the rig control parameters against system limits. In some embodiments, the rig control parameters comprise target output parameters of the mud pump, the drive system, and/or the draw works. In some embodiments, the downhole condition data comprises a stickslip measurement and the downhole condition is one of a plurality of graded stickslip severity levels; the downhole condition data comprises a bottom hole assembly (BHA)/bit whirl measurement and the downhole condition is one of a plurality of graded whirl severity levels; the downhole condition data comprises a steering unit stability measurement and the downhole condition is one of a plurality of graded stability levels; or the downhole condition data comprises a steering proportion measurement and the downhole condition is a dogleg severity yield. In some embodiments, the performance data comprises a pump pressure minimum and maximum, and the rig control system performance is one of a plurality of graded pump pressure limit levels; the performance data is offline status data, and the rig control system performance is either offline or online; the performance data is temperature data, and the rig control system performance is one of a plurality of graded performance levels; or the performance data is equipment power fault data, and the rig control system performance is one of a plurality of graded current limit levels. In some embodiments, a third closed-loop system is formed between the guidance system, the rig control system, and the data acquisition system that optimizes the rig control parameters based on the performance data of the rig control system.

In some embodiments, the present disclosure includes an apparatus adapted to form closed-loop system(s) while drilling with a rotary steerable system ("RSS"), the apparatus comprising: a non-transitory computer readable medium having stored thereon a plurality of instructions, wherein the instructions are executed with at least one processor so that the following steps are executed: (a) receiving, by a data acquisition system and from the RSS, downhole position data relating to a position of the RSS; (b) calculating, by a guidance system that is operably coupled to the data acquisition system and using the downhole position data, borehole position of the RSS; (c) comparing, by the guidance system, the borehole position of the RSS and a target well plan position; (d) generating, by the guidance system, a new path of trajectory for the RSS based on the comparison; wherein the new path of trajectory comprises a required dogleg yield and/or a required toolface; (e) translating, by the guidance system, the required dogleg yield and/or the required toolface to downlink command(s) that is executable by a rig control system; wherein the downlink command(s) involve instructions for the RSS to generate the required dogleg yield and/or the required toolface; and (f) passing, from the guidance system and to the rig control system via the data acquisition system, the downlink command(s) for execution; wherein the steps (a), (b), (c), (d), (e), and (f) occur without user intervention to form a first closed-loop system while drilling with the RSS; and the rig control system, wherein the rig control system is configured to command a mud pump, a drive system, and/or a draw works to initiate the downlink command(s). In some embodiments, the first closed-loop system optimizes the new path of trajectory for the RSS based on responsiveness of the RSS. In some embodiments, the target well plan position comprises a tolerance window surrounding the target well plan position. In some embodiments, when the instructions are executed with at least one processor, the following step is also executed: comparing, by the guidance system, the borehole position of the RSS and the tolerance window surrounding the target well plan position; and the new path of trajectory is based on the comparison of the borehole position of the RSS and the tolerance window surrounding the target well plan position. In some embodiments, when the instructions are executed with at least one processor, the following steps are also executed: (h) receiving, by the data acquisition system and from the RSS, downhole condition data relating to downhole conditions; (i) receiving, by the data acquisition system and from the rig control system, performance data relating to rig control system performance; (j) passing the downhole condition data and the performance data from the data acquisition system to the guidance system; (k) calculating, by the guidance system and using the downhole condition data, actual downhole conditions; (l) comparing, by the guidance system, the actual downhole conditions to target conditions; (m) generating, by the guidance system, rig control parameters based on the comparison and the performance data; (n) passing, from the guidance system and to the rig control system via the data acquisition system, the rig control parameters for execution; wherein the steps (h), (i), (j), (k), (l), (m), and (n) occur without user intervention to form a second closed-loop system while drilling with the RSS; and wherein the rig control system is further configured to command the mud pump, the drive system, and/or the draw works using the rig control parameters. In some embodiments, the second closed-loop system optimizes the rig control parameters. In some embodiments, the rig control system is further configured to compare the rig control parameters against system limits. In some embodiments, the rig control parameters comprise target output parameters of the mud pump, the drive system, and/or the draw works. In some embodiments, the downhole condition data comprises a stickslip measurement and the downhole condition is one of a plurality of graded stickslip severity levels; the downhole condition data comprises a bottom hole assembly (BHA)/bit whirl measurement and the downhole condition is one of a plurality of graded whirl severity levels; the downhole condition data comprises a steering unit stability measurement and the downhole condition is one of a plurality of graded stability levels; or the downhole condition data comprises a steering proportion measurement and the downhole condition is a dogleg severity yield. In some embodiments, the performance data comprises a pump pressure minimum and maximum, and the rig control system performance is one of a plurality of graded pump pressure limit levels; the performance data is offline status data, and the rig control system performance is either offline or online; the performance data is temperature data, and the rig control system performance is one of a plurality of graded performance levels; or the performance data is equipment power fault data, and the rig control system performance is one of a plurality of graded current limit levels. In some embodiments, a third closed-loop system is formed between the guidance system, the rig control system, and the data acquisition system that optimizes the rig control parameters based the performance data of the rig control system.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the present disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact and may also include embodiments in which additional features may be formed interposing the first and second features, such that the first and second features may not be in direct contact.

The apparatus and method disclosed herein form closed-loop systems between a downhole system that includes an RSS and a surface system, to improve stability and performance assurance of the RSS. In some embodiments, the apparatus and method disclosed account for the actual downhole conditions experienced by the RSS, the actual positioning of the RSS, and historical performance of the surface systems such as the mud pump system, the drive system, and the draw works. These closed-loop systems generate and optimize parameters or target outputs, instructions to surface systems, and instructions for the RSS itself. In some embodiments, the instructions for the RSS are downlinked to the RSS, which includes some type of steering device, such as extendable and retractable arms that apply lateral forces along a borehole wall to gradually effect a turn. In contrast to steerable motors, an RSS permits directional drilling to be conducted while the drill string is rotating. As the drill string rotates, frictional forces are reduced, and more bit weight is typically available for drilling.

Figure 1:
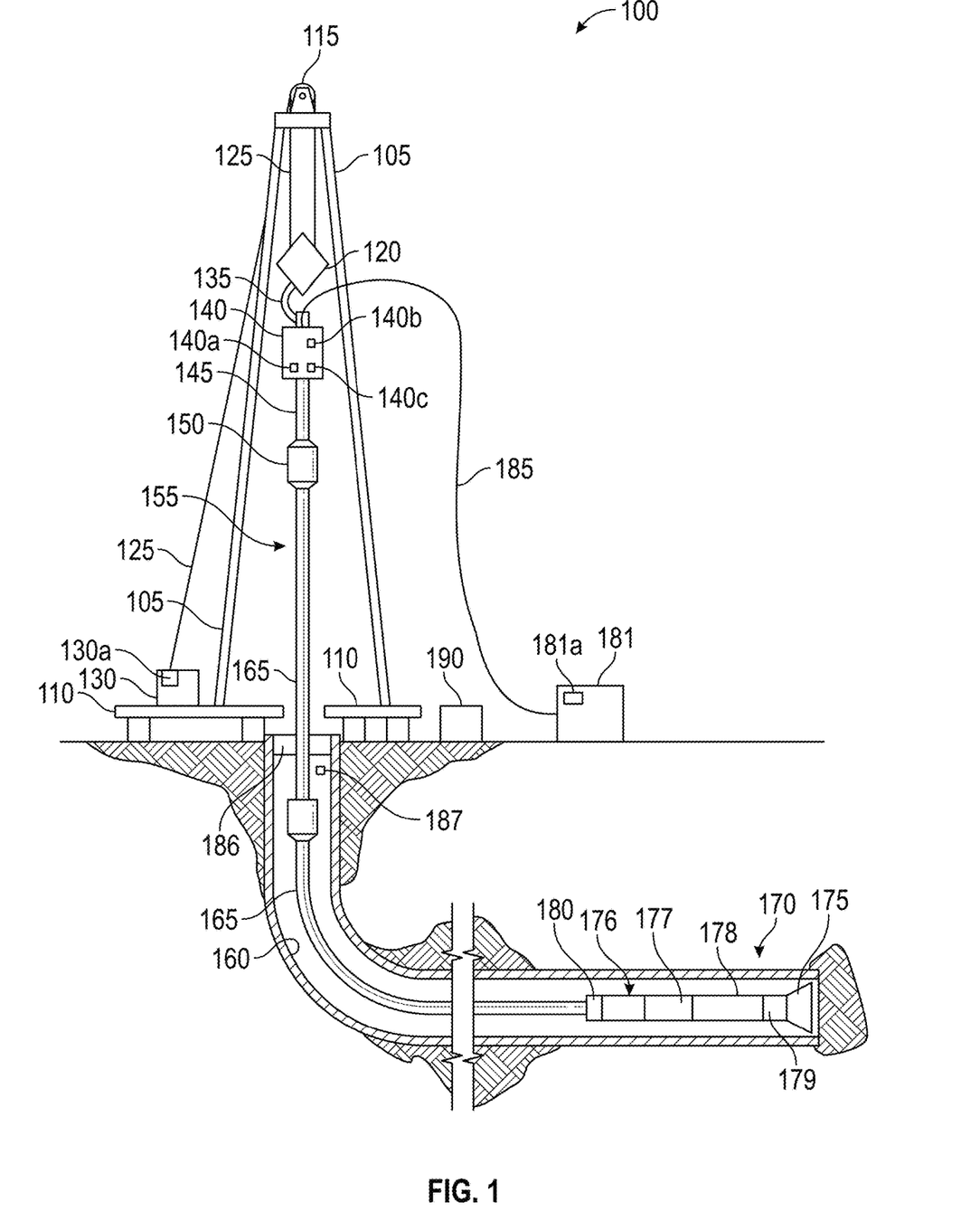
FIG. 1 is a schematic diagram of a drilling rig apparatus according to one or more aspects of the present disclosure.

Referring to FIG. 1, illustrated is a schematic view of an apparatus 100 demonstrating one or more aspects of the present disclosure. The apparatus 100 is or includes a land-based drilling rig. However, one or more aspects of the present disclosure are applicable or readily adaptable to any type of drilling rig, such as jack-up rigs, semisubmersibles, drill ships, coil tubing rigs, well service rigs adapted for drilling and/or re-entry operations, and casing drilling rigs, among others within the scope of the present disclosure.

Apparatus 100 includes a mast 105 supporting lifting gear above a rig floor 110. The lifting gear includes a crown block 115 and a traveling block 120. The crown block 115 is coupled at or near the top of the mast 105, and the traveling block 120 hangs from the crown block 115 by a drilling line 125. One end of the drilling line 125 extends from the lifting gear to draw works 130, which is configured to reel out and reel in the drilling line 125 to cause the traveling block 120 to be lowered and raised relative to the rig floor 110. The draw works 130 may include a rate of penetration ("ROP") sensor 130a, which is configured for detecting an ROP value or range, and a surface control system to feed-out and/or feed-in of a drilling line 125. The other end of the drilling line 125, known as a dead line anchor, is anchored to a fixed position, possibly near the draw works 130 or elsewhere on the rig.

A hook 135 is attached to the bottom of the traveling block 120. A drive system 140 is suspended from the hook 135. A quill 145, extending from the drive system 140, is attached to a saver sub 150, which is attached to a drill string 155 suspended within a wellbore 160. Alternatively, the quill 145 may be attached to the drill string 155 directly. The term "quill" as used herein is not limited to a component which directly extends from the drive system 140, or which is otherwise conventionally referred to as a quill. For example, within the scope of the present disclosure, the "quill" may additionally or alternatively include a main shaft, a drive shaft, an output shaft, and/or another component which transfers torque, position, and/or rotation from the top drive or other rotary driving element to the drill string, at least indirectly. Nonetheless, albeit merely for the sake of clarity and conciseness, these components may be collectively referred to herein as the "quill." In the example embodiment depicted in FIG. 1, the drive system 140 is a rotary drive system that is utilized to impart rotary motion to the drill string 155. However, aspects of the present disclosure are also applicable or readily adaptable to implementations utilizing other drive systems, such as a power swivel, a rotary table, a coiled tubing unit, a downhole motor, and/or a conventional rotary rig, among others.

The apparatus 100 may additionally or alternatively include a torque sensor 140a coupled to or otherwise associated with the drive system 140. The torque sensor 140a may alternatively be located in or associated with the BHA 170. The torque sensor 140a may be configured to detect a value or range of the torsion of the quill 145 and/or the drill string 155 (e.g., in response to operational forces acting on the drill string). The drive system 140 may additionally or alternatively include or otherwise be associated with a speed sensor 140b configured to detect a value or range of the rotational speed of the quill 145. The drive system 140, the draw works 130, the crown block 115, the traveling block 120, drilling line or dead line anchor may additionally or alternatively include or otherwise be associated with a WOB or hook load sensor 140c (e.g., one or more sensors installed somewhere in the load path mechanisms to detect and calculate WOB, which can vary from rig-to-rig). The WOB sensor 140c may be configured to detect a WOB value or range, where such detection may be performed at the drive system 140, the draw works 130, or other component of the apparatus 100. Generally, the hook load sensor 140c detects the load on the hook 135 as it suspends the drive system 140 and the drill string 155.

The drill string 155 includes interconnected sections of drill pipe or tubulars 165 and a BHA 170, which includes a drill bit 175. The BHA 170 may include one or more measurement-while-drilling ("MWD") or wireline conveyed instruments 176, flexible connections 177, an RSS 178 that includes adjustment mechanisms 179 for push-the-bit drilling or bent housing and bent subs for point-the-bit drilling, a downhole control system 180, stabilizers, and/or drill collars, among other components. One or more pumps of a mud pump system 181 may deliver drilling fluid to the drill string 155 through a hose or other conduit 185, which may be connected to the drive system 140. In some embodiments, a mud pump sensor 181a monitors the output of the mud pump system 181 and may measure the flow rate produced by the mud pump system 181 and/or a pressure produced by the mud pump system 181.

The downhole MWD or wireline conveyed instruments 176 may be configured for the evaluation of physical properties such as pressure, temperature, torque, weight-on-bit ("WOB"), vibration, inclination, azimuth, toolface orientation in three-dimensional space, and/or other downhole parameters. These measurements may be made downhole, stored in solid-state memory for some time, sent to the downhole control system 180, and downloaded from the instrument(s) at the surface and/or transmitted real-time to the surface. Data transmission methods may include, for example, digitally encoding data and transmitting the encoded data to the surface, possibly as pressure pulses in the drilling fluid or mud system, acoustic transmission through the drill string 155, electronic transmission through a wireline or wired pipe, and/or transmission as electromagnetic pulses. The MWD tools and/or other portions of the BHA 170 may have the ability to store measurements for later retrieval via wireline and/or when the BHA 170 is tripped out of the wellbore 160.

In some embodiments, the downhole control system 180 is configured to control or assist in the control of one or more components of the apparatus 100. For example, the downhole control system 180 may be configured to transmit operational control signals to the rig control system 190, the draw works 130, the drive system 140, other components of the BHA 170 such as the adjustment mechanism 179, and/or the mud pump system 181. The downhole control system 180 may be a stand-alone component that forms a portion of the BHA 170 or be integrated in the adjustment mechanism 179 or a sensor that forms a portion of the BHA 170. The downhole control system 180 may be configured to transmit the operational control signals or instructions to the draw works 130, the drive system 140, other components of the BHA 170, and/or the mud pump system 181 via wired or wireless transmission means which, for the sake of clarity, are not depicted in FIG. 1.

In an example embodiment, the apparatus 100 may also include a rotating blow-out preventer ("BOP") 186, such as if the wellbore 160 is being drilled utilizing under-balanced or managed-pressure drilling methods. In such embodiment, the annulus mud and cuttings may be pressurized at the surface, with the actual desired flow and pressure possibly being controlled by a choke system, and the fluid and pressure being retained at the well head and directed down the flow line to the choke by the rotating BOP 186. The apparatus 100 may also include a surface casing annular pressure sensor 187 configured to detect the pressure in the annulus defined between, for example, the wellbore 160 (or casing therein) and the drill string 155. It is noted that the meaning of the word "detecting," in the context of the present disclosure, may include detecting, sensing, measuring, calculating, and/or otherwise obtaining data. Similarly, the meaning of the word "detect" in the context of the present disclosure may include detect, sense, measure, calculate, and/or otherwise obtain data.

Generally, a graphical user interface (GUI) is operably coupled to or the rig control system 190. The GUI includes an input mechanism for user-inputs. The input mechanism may include a touch-screen, keypad, voice-recognition apparatus, dial, button, switch, slide selector, toggle, joystick, mouse, data base and/or other conventional or future-developed data input device. Such input mechanism may support data input from local and/or remote locations. Alternatively, or additionally, the input mechanism may include means for user-selection of input parameters, such as selecting a specific downlink sequence or selecting a type of tool that forms a portion of the BHA 170, such as via one or more drop-down menus, input windows, etc. In general, the input mechanism and/or other components within the scope of the present disclosure support operation and/or monitoring from stations on the rig site as well as one or more remote locations with a communications link to the system, network, local area network ("LAN"), wide area network ("WAN"), Internet, satellite-link, and/or radio, among other means. The GUI may also include a display for visually presenting information to the user in textual, graphic, or video form. The display may also be utilized by the user to input the input parameters in conjunction with the input mechanism. For example, the input mechanism may be integral to or otherwise communicably coupled with the display. Depending on the implementation, the display may include, for example, an LED or LCD display computer monitor, touchscreen display, television display, a projector, or other display device. The GUI and the rig control system 190 may be discrete components that are interconnected via wired or wireless means. Alternatively, the GUI and the rig control system 190 may be integral components of a single system or surface control system.

The apparatus 100 also includes a plurality of sensors provide inputs or data to the rig control system 190 via wired or wireless transmission means. The plurality of sensors generally includes the ROP sensor 130a; the torque sensor 140a; the quill speed sensor 140b; the hook load sensor 140c; the mud pump sensor 181a; the surface casing annular pressure sensor 187; a downhole annular pressure sensor; a shock/vibration sensor that is configured for detecting shock and/or vibration in the BHA 170; a toolface sensor configured to estimate or detect the current toolface orientation or toolface angle; a MWD WOB sensor configured to detect WOB at or near the BHA 170; a bit torque sensor that generates data indicative of the torque applied to the bit 175; the hook position sensor; a rotary RPM sensor; a quill position sensor; a pump pressure sensor; a MSE sensor; a bit depth sensor; or other sensor. The downhole annular pressure sensor may be configured to detect a pressure value or range in the annulus-shaped region defined between the external surface of the BHA 170 and the internal diameter of the wellbore 160, which may also be referred to as the casing pressure, downhole casing pressure, MWD casing pressure, or downhole annular pressure. These measurements may include both static annular pressure (pumps off) and active annular pressure (pumps on). However, in other embodiments the downhole annular pressure may be calculated using measurements from a plurality of other sensors located downhole or at the surface of the well. The toolface sensor may be or include a conventional or future-developed gravity toolface sensor which detects toolface orientation relative to the Earth's gravitational field. Alternatively, or additionally, the toolface sensor may be or include a conventional or future-developed magnetic toolface sensor which detects toolface orientation relative to magnetic north or true north. In an example embodiment, a magnetic toolface sensor may detect the current toolface when the end of the wellbore is less than about 7° from vertical, and a gravity toolface sensor may detect the current toolface when the end of the wellbore is greater than about 7° from vertical. However, other toolface sensors may also be utilized within the scope of the present disclosure, including non-magnetic toolface sensors and non-gravitational inclination sensors. The toolface sensor may also, or alternatively, be or include a conventional or future-developed gyro sensor.

The plurality of sensors may additionally or alternatively include an inclination sensor integral to the BHA 170 that is configured to detect inclination at or near the BHA 170. The plurality of sensors may additionally or alternatively include an azimuth sensor integral to the BHA 170 that is configured to detect azimuth at or near the BHA 170. In some embodiments, the BHA 170 also includes another directional sensor (e.g., azimuth, inclination, toolface, combination thereof, etc.) that is spaced along the BHA 170 from a first directional sensor (e.g., the inclination sensor, the azimuth sensor). For example, and in some embodiments, one sensor is positioned in the MWD 176 and another sensor is positioned in the adjustment mechanism 179, with a known distance between them, for example 20 feet, configured to estimate or detect the current toolface orientation or toolface angle. The sensors may be spaced along the BHA 170 in a variety of configurations. The data detected by any of the sensors in the plurality of sensors may be sent via electronic signal to the rig control system 190 via wired or wireless transmission.

The detection performed by the sensors described herein may be performed once, continuously, periodically, and/or at random intervals. The detection may be manually triggered by an operator or other person accessing a human-machine interface ("HMI") or GUI, or automatically triggered by, for example, a triggering characteristic or parameter satisfying a predetermined condition (e.g., expiration of a time period, drilling progress reaching a predetermined depth, drill bit usage reaching a predetermined amount, etc.). Such sensors and/or other detection means may include one or more interfaces which may be local at the well/rig site or located at another, remote location with a network link to the system.

Generally, the apparatus 100: monitors, in real-time, tool settings and drilling operations relating to a wellbore; creates and/or modifies drilling instructions based on the monitored drilling operations; monitors the responsiveness of drilling equipment used in the drilling operation; and optimizes drilling instructions in response to the past responsiveness. As used herein, the term "real-time" is thus meant to encompass close to real-time, such as within about 10 seconds, preferably within about 5 seconds, and more preferably within about 2 seconds. "Real-time" can also encompass an amount of time that provides data based on a wellbore drilled to a given depth to provide actionable data according to the present disclosure before a further wellbore being drilled achieves that depth.

Figure 2:
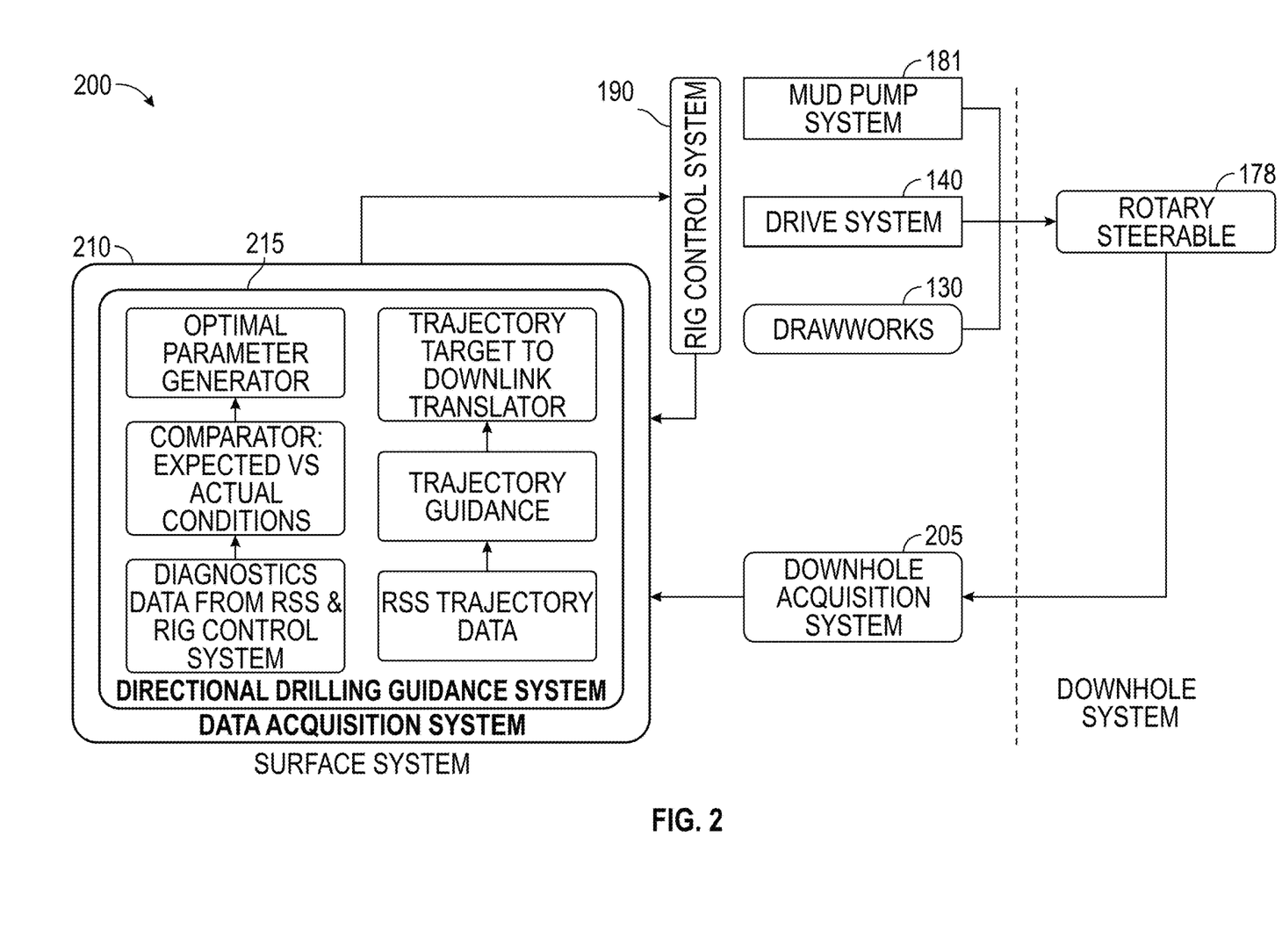
FIG. 2 is a schematic illustration of a portion of the apparatus of FIG. 1, according to one or more aspects of the present disclosure.

FIG. 2 is a diagrammatic illustration of a data flow 200 involving at least a portion of the apparatus 100 according to one embodiment. Generally, the RSS 178 sends wellbore positioning, downhole diagnostics, and operating mode uphole using MWD telemetry or wired drill pipe. The data sent from the RSS 178 is generally received by a downhole acquisition system ("DOAS") 205, which processes the data to meaningful values. The DOAS 205 then sends the processed data to a data acquisition system ("DAAS") 210 and a directional drilling guidance system ("DDGS") 215. The DAAS 210 provides downlink command(s), rig control operating parameters, and engineering limits to the rig control system 190, which provides feedback on equipment diagnostics and dysfunction back to the DAAS 210. The DOAS 205 provides optimal surface parameters—via the rig control system 190—to the mud pump system 181, the drive system 140, and the draw works 130 to form closed-loop system(s) that do not require manual or human intervention to control the RSS 178.

Figure 3:
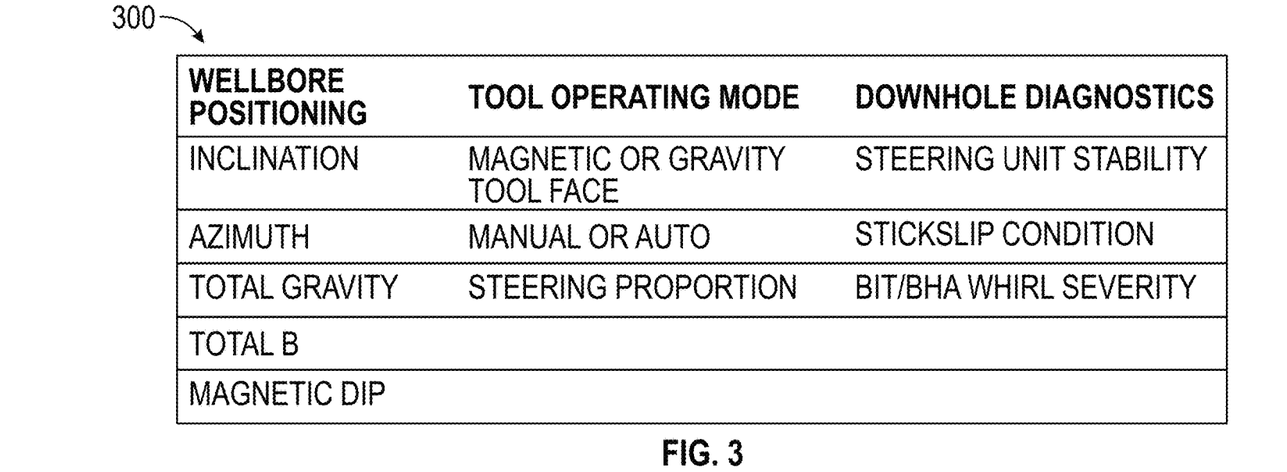
FIG. 3 is chart illustrating data generated and/or received by the drilling rig apparatus of the FIG. 1, according to one or more aspects of the present disclosure.

In some embodiments, the RSS 178 produces wellbore downhole data that includes wellbore positioning measurements, tool operating mode data, and downhole diagnostics data such as steering unit stability and downhole dysfunction measurements. FIG. 3 depicts a chart 300 detailing different categories of information that may be sent from the RSS 178, which include wellbore positioning measurements, tool operating mode data, and downhole diagnostics data. As noted above, the RSS 178 generally sends data through MWD telemetry or a wired drill pipe system. The RSS 178 sends downhole measurements such as inclination, azimuth, total gravity, total B, and magnetic dip that relate to wellbore positioning. The RSS 178 sends tool operating mode data such as magnetic or gravity tool face, manual or auto, and steering proportion. In addition to such measurements and data, downhole diagnostics are also sent uphole to provide feedback to the DAAS 210 to operate and make adjustments to the tools setting. Examples of downhole diagnostics include steering unit stability, stickslip condition, and Bit/BHA whirl severity. Generally, the data sent from the RSS 178 allows the DAAS 210 to take actions to control surface parameters, mitigate drilling dysfunctions, and decide to change steering commands to the rotary steerable tool.

Figure 4:
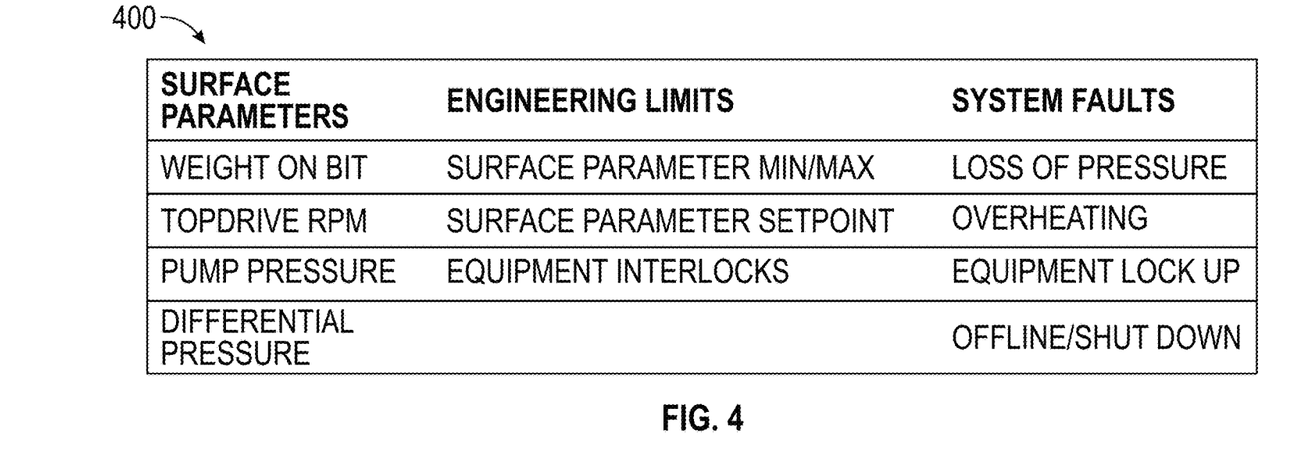
FIG. 4 is chart illustrating data generated and/or received by the drilling rig apparatus of the FIG. 1, according to one or more aspects of the present disclosure.

In some embodiments, the rig control system 190 is, or forms a portion of, a computing system that is configured to control or assist in the control of one or more components of the apparatus 100. For example, the rig control system 190 may be configured to transmit operational control signals to the draw works 130, the drive system 140, the BHA 170 and/or the mud pump system 181. The rig control system 190 may be a stand-alone component installed near the mast 105 and/or other components of the apparatus 100. In an example embodiment, the rig control system 190 includes one or more systems located in a control room proximate the mast 105, such as the general-purpose shelter often referred to as the "doghouse" serving as a combination tool shed, office, communications center, and general meeting place. The rig control system 190 may be configured to transmit the operational control signals to the draw works 130, the drive system 140, the BHA 170, and/or the mud pump system 181 via wired or wireless transmission means. In some embodiments the rig control system 190 uses the torque sensor 140*a*, the quill position sensor, the hook load sensor 140*c*, the pump pressure sensor, the MSE sensor, the rotary RPM sensor, the sensor 181*a* for monitoring the output of the mud pump system 181, the drive system 140, and the draw works 130. The rig control system 190 controls the rotational position, speed and direction of the quill or other drill string component coupled to the drive system (such as the quill 145 shown in FIG. 1). The drive control signal sent from the rig control system 190 directs the position (e.g., azimuth), spin direction, spin rate, and/or oscillation of the quill 145. The rig control system 190 also controls the draw works and/or other means for controlling the feed-out and/or feed-in of the drilling line 125. Such control may include rotational control of the draw works (in v. out) to control the height or position of the hook 135 and may also include control of the rate the hook 135 ascends or descends. The rig control system 190 also produces rig equipment diagnostics information that is indicative of equipment health and/or responsiveness. FIG. 4 is a chart 400 of different categories of information that can be obtained from the rig control system 190.

In some embodiments, the DOAS 205 receives data and information from the RSS 178. Generally, the data and information must be decoded and processed to make meaningful values. In some embodiments, the DOAS 205 is owned, operated, or controlled by a RSS company that provides the RSS 178 and the data processing and decoding algorithms are proprietary to the RSS company.

In some embodiments, the DAAS 210 collects data, information, feedback, and/or measurements from the rig control system 190 and the DOAS 205. In some embodiments, the DAAS 210 passes the output of the DDGS 215 to the rig control system 190.

In some embodiments, the DDGS 215 is an electronic application operably coupled to the rig control system 190. The DDGS 215 may include a variety of sub modules, with each of the sub modules being associated with a predetermined workflow or recipe that executes a task from beginning to end. Often, the predetermined workflow includes a set of computer-implemented instructions for executing the task from beginning to end, with the task being one that includes a repeatable sequence of steps that take place to implement the task. As illustrated in FIG. 2 and in some embodiments, there are two data flows associated with the DDGS 215. The first data flow includes receiving the RSS trajectory data, using trajectory guidance to identify a trajectory target, and using a trajectory-target-to-downlink translator to identify the appropriate downlink command(s) that the rig control system 190 would execute to achieve the trajectory target. The second data flow includes receiving diagnostics data from the RSS 178 and the rig control system 190, using a comparator to compare the target conditions to actual conditions, and using an optimal parameter generator to generate optimal parameters.

Figure 5:
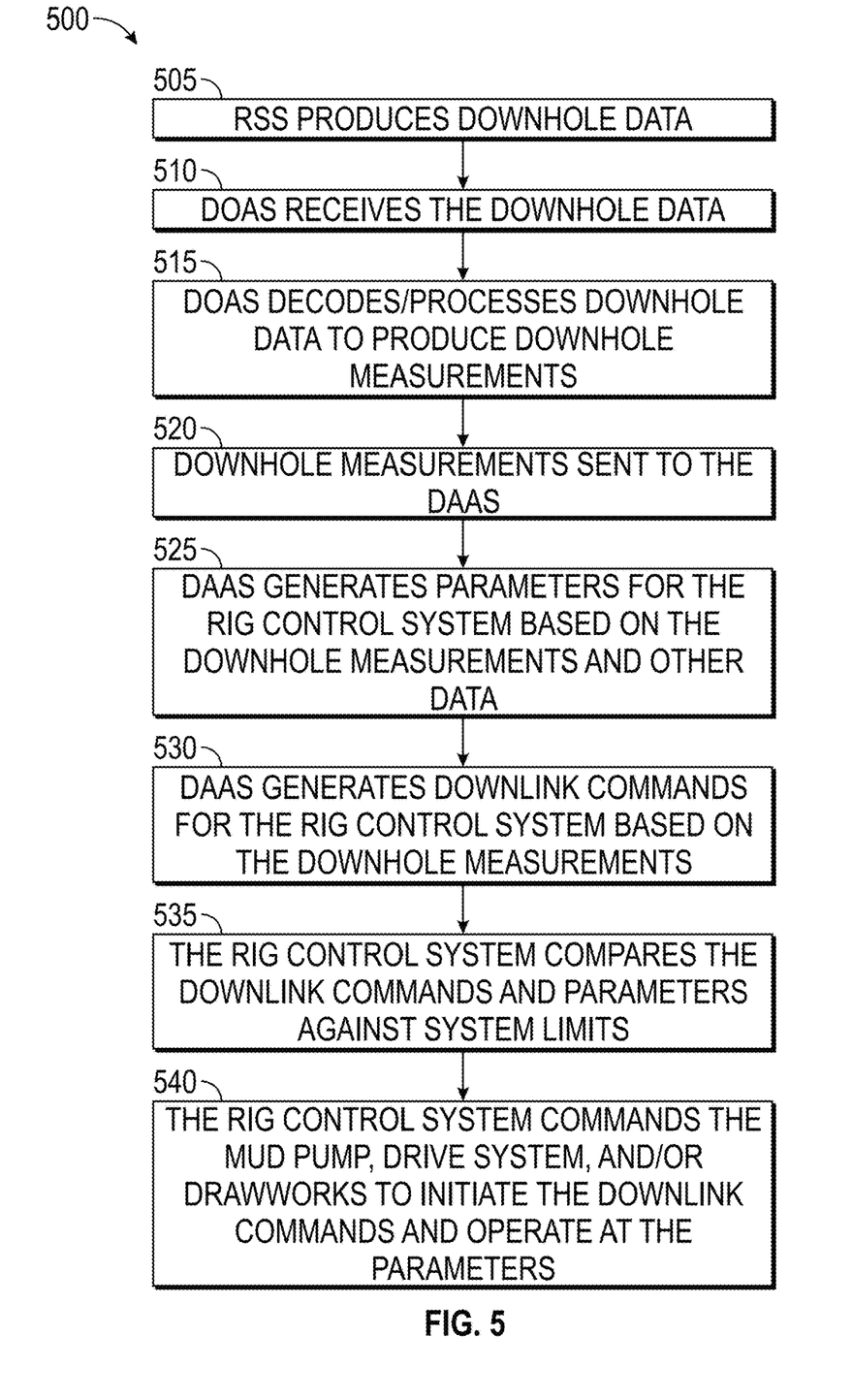
FIG. 5 is a flow chart diagram of a method according to one or more aspects of the present disclosure.

FIG. 5 is a flow chart showing an example method 500 of using closed-loop system(s) while drilling with the RSS 178. It is understood that additional steps can be provided before, during, and after the steps of method 500, and that some of the steps described can be replaced or eliminated for other implementations of the method 500. In an example embodiment, the method 500 includes the RSS 178 producing downhole data at step 505; receiving, by the DOAS 205, the downhole data at step 510; decoding and/or processing the downhole data by the DOAS 205 to produce downhole measurements at step 515; sending the downhole measurements to the DAAS 210 at step 520; the DAAS 210 generating parameters for the rig control system 190 based on the downhole measurements and other data at step 525; the DAAS 210 generating downlink command(s) for the rig control system 190 based on the downhole measurements at step 530; the rig control system 190 comparing the downlink commands and parameters against system limits at step 535; and the rig control system 190 commanding the mud pump 181, the drive system 140, the draw works 130, or a combination thereof, to initiate the downlink commands and operate at the parameters at step 540.

In some embodiments and at the step 505, the RSS 178 produces wellbore downhole data. In some embodiments, the wellbore downhole data includes downhole/wellbore position data relating to a position of the RSS as well as downhole condition data relating to downhole conditions. Moreover, the RSS 178 generally produces wellbore downhole data that includes downhole diagnostics to provide feedback so that adjustments may be made to a setting of a tool that forms the RSS 178.

In some embodiments and at step 510, the DOAS 205 receives the wellbore downhole data. As noted above, the DOAS 205 may receive the wellbore downhole data via mud pulse telemetry of other means of communication.

In some embodiments and at the step 515, the DOAS 205 decodes and/or processes the wellbore downhole data to produce downhole measurements. Examples of specific wellbore downhole measurements, such as wellbore positioning, produced by the RSS 178 and decoded by the DOAS 205 is listed in FIG. 3.

Figure 6:
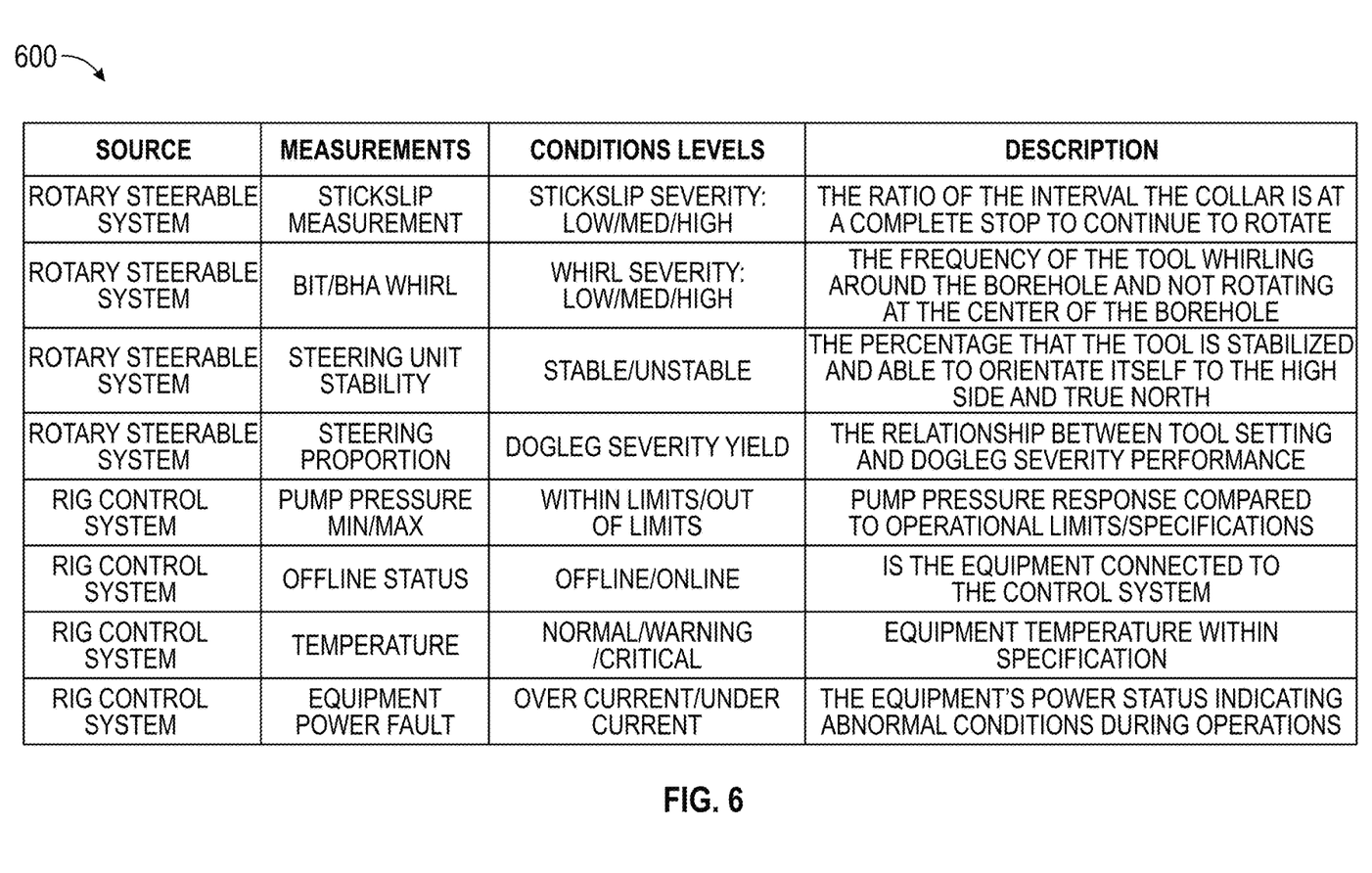
FIG. 6 is chart illustrating data generated and/or received by the drilling rig apparatus of the FIG. 1, according to one or more aspects of the present disclosure.

At step 520, the downhole measurements are sent to the DAAS 210 at step 520. The downhole measurements may be sent via a wireless network or a wired connection. In some embodiments, the DAAS 210 will analyze the downhole measurements sent from the DOAS 205 to determine actual downhole conditions. FIG. 6 illustrates a chart 600 that includes exemplary measurements provided by the RSS 178, such as a stickslip measurement, a Bit/BHA whirl, steering unit stability, and steering proportion.

Figure 7:
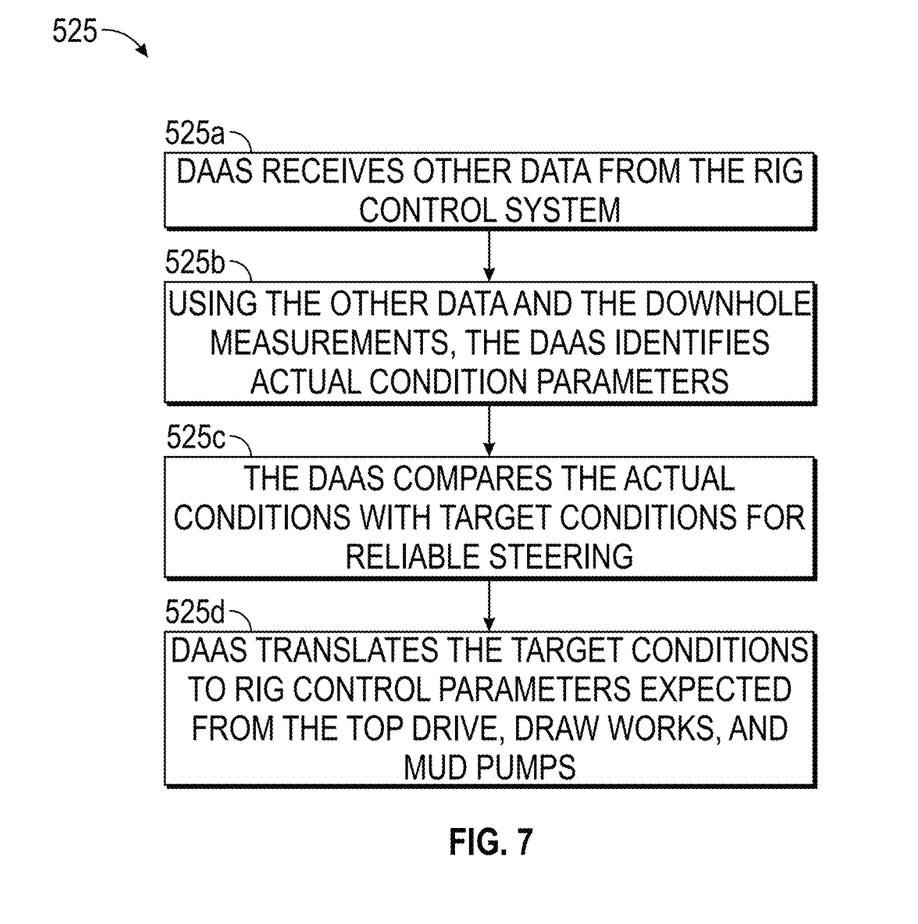
FIG. 7 is a flow chart diagram of a method according to one or more aspects of the present disclosure.

In some embodiments and at the step 525, the DAAS 210 generates parameters for the rig control system 190 based on the downhole measurements and other data. In some embodiments and during the step 525, optimization software, which is an algorithm module that forms a portion of the DAAS 210, compares the actual conditions and the target conditions for an optimal rotary steering system and rig control system performance. Then from these two conditions, an optimization engine will generate parameters that are passed to the rig control system 190. FIG. 7 illustrates optional sub-steps to the step 525 that include the DAAS 210 receiving other data from the rig control system 190 at step 525a, the DAAS 210 using the other data and the downhole measurements to identify actual condition parameters at step 525b, the DAAS 210 comparing the actual conditions with target conditions for reliable steering at step 525c, and the DAAS 210 translating the target conditions to rig control parameters expected from the top drive 140, the draw works 130, and the mud pumps 181 at step 525d.

In some embodiments and at the step 525a, other data from the rig control system 190 is received by the DAAS 210. Referring back to FIG. 6, the chart 600 also includes measurements/data provided by the rig control system 190, such as a pump pressure minimum and maximum, offline status, temperature, and equipment power fault data. In some embodiments, the other data also includes the surface parameters listed in the chart 400 as well as rig equipment diagnostics information that provides indication of equipment health.

In some embodiments and at the step 525b, the DAAS 210 uses the other data and the downhole measurements to identify actual condition parameters. Generally, at the step 525b, the DAAS 210 unpackages the diagnostics measurements from the RSS 178 and the rig control system 190 to determine actual conditions parameters. The chart 600 includes example actual condition parameters, under the column "Conditions Levels." As illustrated in FIG. 6, the DAAS 210 uses the downhole measurements from the RSS 178 and the other data from the rig control system 190 to identify actual condition levels. In some embodiments, the downhole condition data comprises a stickslip measurement and the downhole condition is one of a plurality of graded stickslip severity levels (e.g., low, medium, and high); the downhole condition data comprises a bottom hole assembly (BHA)/bit whirl measurement and the downhole condition is one of a plurality of graded whirl severity levels (e.g., low, medium, and high); the downhole condition data comprises a steering unit stability measurement and the downhole condition is one of a plurality of graded stability levels (e.g., stable and unstable); or the downhole condition data comprises a steering proportion measurement and the downhole condition is a dogleg severity yield. In some embodiments, the performance data comprises a pump pressure minimum and maximum, and the rig control system performance is one of a plurality of graded pump pressure limit levels (e.g., within limits and outside of limits); the performance data is offline status data, and the rig control system performance is either offline or online; the performance data is temperature data, and the rig control system performance is one of a plurality of graded performance levels (e.g., normal, warning, and critical); or the performance data is equipment power fault data, and the rig control system performance is one of a plurality of graded current limit levels (e.g., over current and under current).

In some embodiments and at the step 525c, the DAAS 210 compares the actual conditions with expected/target conditions that are associated with reliable steering. The optimal parameter generator of the DAAS 210, more specifically the DDGS 215, receives the actual condition levels/parameters and compares those with the target conditions. The comparator algorithm fine tunes the target parameters that is required by the RSS 178 to perform optimally and reliably.

In some embodiments and at the step 525*d*, the DAAS 210 translates the target conditions to rig control parameters expected from the top drive 140, the draw works 130, and the mud pumps 181. Moreover, and in some embodiments, the DAAS 210 also considers feedback from the rig control system 190 as an input when optimizing the final parameters sent to the rig controls system 190.

Figure 8:
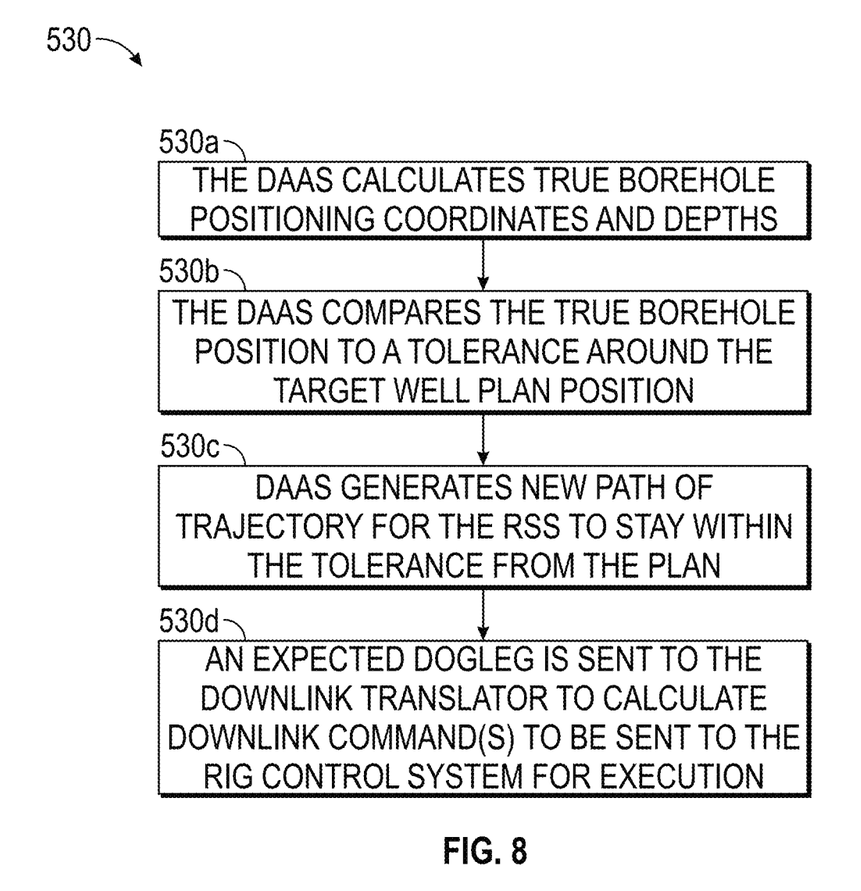
FIG. 8 is a flow chart diagram of a method according to one or more aspects of the present disclosure.

In some embodiments and at the step 530, the DAAS 210 generates downlink commands for the rig control system 190 based on the downhole measurements. Generally, at the step 530, the trajectory-target-to-downlink translator translates the required dogleg output and the steering proportion of the rotary steerable tool to downlink command or commands that is required to achieve the target trajectory that allows wellbore to stay within the well plan boundaries. FIG. 8 illustrates optional sub-steps to the step 530 that include the DAAS 210 calculating a true borehole positioning coordinates and depths at step 530*a*, the DAAS 210 comparing the true borehole position to a tolerance window around the target well plan position at step 530*b*, the DAAS 210 generating a new path of trajectory for the RSS 178 to stay within the tolerance from the plan at step 530*c*, and sending an expected dogleg to the downlink translator to calculate downlink command(s) to be sent to the rig control system 190 to execute at step 530*d*.

In some embodiments and at the step 530*a*, the DAAS 210 calculates a true borehole positioning coordinates and depths at step 530*a*. In some embodiments, the wellbore positioning data comprises for example, measured depth, inclination and azimuth, which is processed to calculate true borehole positioning coordinates and depths. However, in other embodiments, the true borehole positioning coordinates and depths will be provided to the DAAS 210. Regardless, the trajectory guidance system will receive the extended borehole positioning information.

In some embodiments and at the step 530*b*, the DAAS 210 compares the true borehole position to a tolerance around the target well plan position. In some embodiments, the DAAS 210 compares the true borehole position to the target well plan position and then to the tolerance around the target well plan position but in other embodiments the true borehole position to the target well plan position and the tolerance simultaneously.

In some embodiments and at the step 530*c*, the DAAS 210 generates a new path of trajectory for the RSS 178 to stay within the tolerance from the plan. Often, the comparison during the step 530*b* will result in a new path of trajectory that is expected from the RSS 178 to stay within the tolerance from the plan. In some embodiments, the new path trajectory will include a required toolface and/or a required dogleg yield in degree/100 to achieve the trajectory path.

In some embodiments and at the step 530*d*, the required dogleg yield and/or the required toolface is sent to the downlink translator to calculate downlink command(s) to be sent to the rig control system 190 to execute. Generally, the required dogleg output and/or the required toolface is passed to the downlink translator, which will calculate the downlink command or series of commands that will be sent to the rig control system 190 to execute. The downlink translator will also determine if a downlink should be performed based on tolerance around well plan, thus minimizing the number of required downlink commands to the rotary steerable tools. In some embodiments, the DAAS 210 will collect the downlink commands and surface parameters instructions from a directional drilling guidance system and pass it to the rig control system 190 to execute.

In some embodiments, the steps 525 and 530, along their respective optional sub steps, are executed by the DDGS 215.

In some embodiments and at the step 535, the rig control system 190 compares the downlink commands and parameters against system limits. The rig control system 190 receives the downlink commands and surface parameters and ensures that it does not exceed any system limits. If there are any system limits that are exceeded, the rig control system 190 will send feedback to the DAAS 210 to fine tune the surface parameters.

In some embodiments and at the step 535, the rig control system 190 commands the mud pump 181, the drive system 140, and/or the draw works 130 to initiate the downlink commands and operate at the parameters. Generally, the mud pump 181 controls the surface flow parameters to ensure proper pressure drops across the RSS 178 to exert the pad force on the formation during steering. The mud pump 181 is also commanded to execute downlink commands using a sequence of flow rate changes or pump pressure changes. Generally, the draw works 130 control the amount of downhole weight on bit to ensure proper dogleg yield from the RSS 178. Generally, the drive system 140 controls the RPMs to ensure proper surface and downhole torque response and to mitigate stickslip, shocks, and vibrations.

In some embodiments, a first closed-loop system is formed between the RSS 178, the rig control system 190, the DOAS 205, and the DAAS 210 and focuses on the optimizing the trajectory and execution of the trajectory of the RSS 178. In some embodiments, a second closed-loop system is formed between the RSS 178, the rig control system 190, the DOAS 205, and the DAAS 210 and focuses on the optimizing rig control parameters so that the RSS is subject to ideal/target conditions. In some embodiments, a third closed-loop system is formed between the rig control system 190 and the DAAS 210 and focuses on the optimizing rig control parameters based on the responsiveness of the systems controlled by the rig control system 190.

In some embodiments, the apparatus 100 and the method 500 do not require manual selection of the appropriate drilling parameters to maintain rotary steerable system's stability to steer well trajectory. In some embodiments, the apparatus 100 and the method 500 automatically optimize drilling parameters to mitigate drilling dysfunctions identified by the RSS's diagnostics sent uphole. In some embodiments, the apparatus 100 and the method 500 automatically manage rotary toolface consistency without manual intervention from the driller. In some embodiments, the apparatus 100 and the method 500 provide a closed-loop system involving surface parameter inputs and the rotary steerable system response. In some embodiments, the apparatus 100 and the method 500 do not require the user to manually select the appropriate downlink commands to the rotary steerable system to stay within the planned trajectory. In some embodiments, the apparatus 100 and the method 500 automatically assess required rotary steerable system operating conditions to steer in the right direction.

In some embodiments, the DOAS 205, the DAAS 210, and the DDGS 215 are applications, systems, and application programs that are executed using a computing system. Each may be located near the apparatus 100 and at the surface of the well or may be remote from the apparatus 100.

Figure 9:
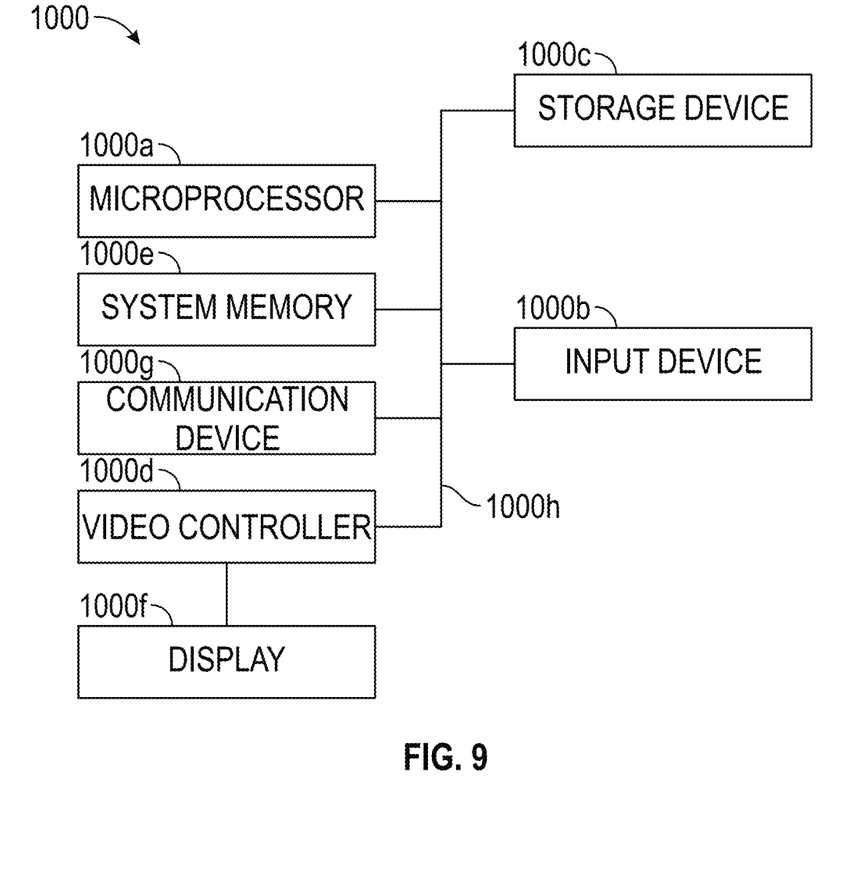
FIG. 9 is a diagrammatic illustration of a node for implementing one or more example embodiments of the present disclosure, according to an example embodiment.

In an example embodiment, as illustrated in FIG. 9 with continuing reference to FIGS. 1-8, an illustrative node 1000 for implementing one or more of the example embodiments described above and/or illustrated in FIGS. 1-8 is depicted. The illustrative node 1000 includes a microprocessor 1000a, an input device 1000b, a storage device 1000c, a video surface control system 1000d, a system memory 1000e, a display 1000f, and a communication device 1000g all interconnected by one or more buses 1000h. In several example embodiments, the storage device 1000c may include a floppy drive, hard drive, CD-ROM, optical drive, any other form of storage device and/or any combination thereof. In several example embodiments, the storage device 1000c may include, and/or be capable of receiving, a floppy disk, CD-ROM, DVD-ROM, or any other form of computer-readable medium that may contain executable instructions. In several example embodiments, the communication device 1000g may include a modem, network card, or any other device to enable the node to communicate with other nodes. In several example embodiments, any node represents a plurality of interconnected (whether by intranet or Internet) computer systems, including without limitation, personal computers, mainframes, PDAs, smartphones and cell phones.

In several example embodiments, one or more of the components of the systems described above and/or illustrated in FIGS. 1-8 include at least the illustrative node 1000 and/or components thereof, and/or one or more nodes that are substantially similar to the illustrative node 1000 and/or components thereof. In several example embodiments, one or more of the above-described components of the illustrative node 1000, the system 10, and/or the example embodiments described above and/or illustrated in FIGS. 1-8 include respective pluralities of same components.

In several example embodiments, one or more of the applications, systems, and application programs described above and/or illustrated in FIGS. 1-9 include a computer program that includes a plurality of instructions, data, and/or any combination thereof; an application written in, for example, Arena, Hypertext Markup Language (HTML), Cascading Style Sheets (CSS), JavaScript, Extensible Markup Language (XML), asynchronous JavaScript and XML (Ajax), and/or any combination thereof; a web-based application written in, for example, Java or Adobe Flex, which in several example embodiments pulls real-time information from one or more servers, automatically refreshing with latest information at a predetermined time increment; or any combination thereof.

In several example embodiments, a computer system typically includes at least hardware capable of executing machine readable instructions, as well as the software for executing acts (typically machine-readable instructions) that produce a desired result. In several example embodiments, a computer system may include hybrids of hardware and software, as well as computer sub-systems.

In several example embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several example embodiments, hardware may include any physical device that is capable of storing machine-readable instructions, such as memory or other data storage devices. In several example embodiments, other forms of hardware include hardware sub-systems, including transfer devices such as modems, modem cards, ports, and port cards, for example.

In several example embodiments, software includes any machine code stored in any memory medium, such as RAM or ROM, and machine code stored on other devices (such as floppy disks, flash memory, or a CD ROM, for example). In several example embodiments, software may include source or object code. In several example embodiments, software encompasses any set of instructions capable of being executed on a node such as, for example, on a client machine or server.

In several example embodiments, combinations of software and hardware could also be used for providing enhanced functionality and performance for certain embodiments of the present disclosure. In an example embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several example embodiments, computer readable mediums include, for example, passive data storage, such as a random-access memory (RAM) as well as semi-permanent data storage such as a compact disk read only memory (CD-ROM). One or more example embodiments of the present disclosure may be embodied in the RAM of a computer to transform a standard computer into a new specific computing machine. In several example embodiments, data structures are defined organizations of data that may enable an embodiment of the present disclosure. In an example embodiment, a data structure may provide an organization of data, or an organization of executable code.

In several example embodiments, any networks and/or one or more portions thereof may be designed to work on any specific architecture. In an example embodiment, one or more portions of any networks may be executed on a single computer, local area networks, client-server networks, wide area networks, internets, hand-held and other portable and wireless devices and networks.

In several example embodiments, a database may be any standard or proprietary database software. In several example embodiments, the database may have fields, records, data, and other database elements that may be associated through database specific software. In several example embodiments, data may be mapped. In several example embodiments, mapping is the process of associating one data entry with another data entry. In an example embodiment, the data contained in the location of a character file can be mapped to a field in a second table. In several example embodiments, the physical location of the database is not limiting, and the database may be distributed. In an example embodiment, the database may exist remotely from the server, and run on a separate platform. In an example embodiment, the database may be accessible across the Internet. In several example embodiments, more than one database may be implemented.

In several example embodiments, a plurality of instructions stored on a non-transitory computer readable medium may be executed by one or more processors to cause the one or more processors to carry out or implement in whole or in part the above-described operation of each of the above-described example embodiments of the system, the method, and/or any combination thereof. In several example embodiments, such a processor may include one or more of the microprocessor 1000a, any processor(s) that are part of the components of the system, and/or any combination thereof, and such a computer readable medium may be distributed among one or more components of the system. In several example embodiments, such a processor may execute the plurality of instructions in connection with a virtual computer system. In several example embodiments, such a plurality of instructions may communicate directly with the one or more processors, and/or may interact with one or more operating systems, middleware, firmware, other applications, and/or any combination thereof, to cause the one or more processors to execute the instructions.

In several example embodiments, the elements and teachings of the various illustrative example embodiments may be combined in whole or in part in some or all of the illustrative example embodiments. In addition, one or more of the elements and teachings of the various illustrative example embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several example embodiments, while different steps, processes, and procedures are described as appearing as distinct acts, one or more of the steps, one or more of the processes, and/or one or more of the procedures may also be performed in different orders, simultaneously, and/or sequentially. In several example embodiments, the steps, processes and/or procedures may be merged into one or more steps, processes, and/or procedures.

In several example embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations and this is within the contemplated scope of disclosure herein, unless stated otherwise.

The phrase "at least one of A and B" should be understood to mean "A, B, or both A and B." The phrases "one or more of the following: A, B, and C" and "one or more of A, B, and C" should each be understood to mean "A, B, or C; A and B, B and C, or A and C; or all three of A, B, and C."

The foregoing outlines features of several implementations so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the implementations introduced herein. One of ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to allow the reader to quickly ascertain the nature of the technical disclosure. It is submitted with the understanding that it will not be used to interpret or limit the scope or meaning of the claims.

Although several example embodiments have been described in detail above, the embodiments described are example only and are not limiting, and those of ordinary skill in the art will readily appreciate that many other modifications, changes and/or substitutions are possible in the example embodiments without materially departing from the novel teachings and advantages of the present disclosure. Accordingly, all such modifications, changes and/or substitutions are intended to be included within the scope of this disclosure as defined in the following claims. In the claims, means-plus-function clauses are intended to cover the structures described herein as performing the recited function and not only structural equivalents, but also equivalent structures. Moreover, it is the express intention of the applicant not to invoke 35 U.S.C. § 112(f) for any limitations of any of the claims herein, except for those in which the claim expressly uses the word "means" together with an associated function.

What is claimed is:

1. A method of using closed-loop system(s) while drilling with a rotary steerable system ("RSS"), wherein the method comprises:
    (a) receiving, by a data acquisition system and from the RSS, downhole condition data comprising a steering proportion measurement, the downhole condition data relating to a downhole condition, the downhole condition being a dogleg severity yield;
    (b) receiving, by the data acquisition system and from a rig control system associated with the data acquisition system, performance data relating to rig control system performance;
    (c) transmitting the downhole condition data and the performance data from the data acquisition system to a guidance system;
    (d) calculating, by the guidance system and using the downhole condition data, an actual downhole condition;
    (e) comparing, by the guidance system, the actual downhole condition to a target condition;
    (f) generating, by the guidance system, rig control parameters for a new path of trajectory having a required dogleg yield based on the comparison and the performance data;
    (g) transmitting, from the guidance system and to the rig control system via the data acquisition system, the rig control parameters for execution; and
    (h) the rig control system commanding a mud pump, a rotary drive system, and/or a draw works to operate at the rig control parameters for the new path of trajectory having the required dogleg yield;
    wherein the steps (a), (b), (c), (d), (e), (f), (g), and (h) occur without user intervention to form a closed-loop system while drilling with the RSS.

2. The method of claim 1, wherein the target condition is generated by an optimal parameter generator associated with the guidance system.

3. The method of claim 1, wherein the closed-loop system optimizes the rig control parameters.

4. The method of claim 1, wherein the rig control system compares the rig control parameters against system limits.

5. The method of claim 1, wherein:
    the performance data comprises a pump pressure minimum and maximum and the rig control system performance is one of a plurality of graded pump pressure limit levels; or
    the performance data is offline status data and the rig control system performance is either offline or online.

6. The method of claim 1, wherein:
the performance data is temperature data and the rig control system performance is one of a plurality of graded performance levels; or
the performance data is equipment power fault data and the rig control system performance is one of a plurality of graded current limit levels.

7. The method of claim 1, further comprising:
receiving, by the data acquisition system and from the rig control system, rig equipment diagnostic data relating to rig equipment health; and
providing, by the data acquisition system and based on the rig equipment diagnostic data relating to the rig equipment health, an indication of equipment health.

8. The method of claim 1, wherein a second closed-loop system is formed between the guidance system, the rig control system, and the data acquisition system that optimizes the rig control parameters based on the performance data of the rig control system.

9. An apparatus adapted to form closed-loop system(s) while drilling with a rotary steerable system ("RSS"), the apparatus comprising:
a non-transitory computer readable medium having stored thereon a plurality of instructions, wherein the instructions are executed with at least one processor so that the following steps are executed:
(a) receiving, by a data acquisition system and from the RSS, downhole condition data comprising a steering proportion measurement, the steering proportion measurement relating to a downhole condition, the downhole condition being a dogleg severity yield;
(b) receiving, by the data acquisition system and from a rig control system associated with the data acquisition system, performance data relating to rig control system performance;
(c) transmitting the downhole condition data and the performance data from the data acquisition system to a guidance system;
(d) calculating, by the guidance system and using the downhole condition data, an actual downhole condition;
(e) comparing, by the guidance system, the actual downhole condition to a target condition;
(f) generating, by the guidance system, rig control parameters for a new path of trajectory having a required dogleg yield based on the comparison and the performance data;
(g) transmitting, from the guidance system and to the rig control system via the data acquisition system, the rig control parameters for execution; and
(h) the rig control system commanding a mud pump, a rotary drive system, and/or a draw works to operate at the rig control parameters for the new path of trajectory having the required dogleg yield;
wherein the steps (a), (b), (c), (d), (e), (f), (g), and (h) occur without user intervention to form a closed-loop system while drilling with the RSS.

10. The apparatus of claim 9, wherein the guidance system comprises an optimal parameter generator to generate the target condition.

11. The apparatus of claim 9, wherein the closed-loop system optimizes the rig control parameters.

12. The apparatus of claim 9, wherein the rig control system compares the rig control parameters against system limits.

13. The apparatus of claim 9, wherein:
the performance data comprises a pump pressure minimum and maximum and the rig control system performance is one of a plurality of graded pump pressure limit levels; or
the performance data is offline status data and the rig control system performance is either offline or online.

14. The apparatus of claim 9, wherein:
the performance data is temperature data and the rig control system performance is one of a plurality of graded performance levels; or
the performance data is equipment power fault data and the rig control system performance is one of a plurality of graded current limit levels.

15. The apparatus of claim 9, further comprising:
receiving, by the data acquisition system further receives and from the rig control system, rig equipment diagnostic data relating to rig equipment health; and
providing, by the data acquisition system and based on the rig equipment diagnostic data relating to the rig equipment health, an indication of equipment health.

16. The apparatus of claim 9, wherein a second closed-loop system is formed between the guidance system, the rig control system, and the data acquisition system that optimizes rig control parameters based on the performance data of the rig control system.

* * * * *